Dec. 8, 1959

R. J. O'NEILL 2,916,159

MOUNTING CLIP

Filed June 5, 1956

Richard J. O'Neill
INVENTOR.

BY Albert Rosen
Morris Spector

ATTORNEYS

United States Patent Office 2,916,159

Patented Dec. 8, 1959

2,916,159

MOUNTING CLIP

Richard J. O'Neill, Los Angeles, Calif., assignor, by mesne assignments, to Thompson Ramo Wooldridge Inc., Cleveland, Ohio, a corporation of Ohio Application June 5, 1956, Serial No. 589,420

5 Claims. (Cl. 211—89)

This invention relates to a mounting clip for securing components against shock and vibration, and more particularly to a mounting clip suitable for securing electrical components such as transistors.

It is common in the electrical art to use clips to mount electrical components such as transistors upon a mounting board. Such clips are riveted to the mounting board and the leads of the components that they hold may go to printed circuits on the reverse side of the board. However, presently known mounting clips are not entirely satisfactory since a clip is riveted to the mounting board for every component that must be held, and the rivets interfere with the printed circuits. In addition to interfering with the printed circuits on the backs of the mounting boards, these clips also take up considerable space on the fronts of the boards, severely limiting the number of components that can be mounted upon any one board. Further, the numbers of such clips that are needed, and the necessity for riveting each one, make their use expensive, laborious, and troublesome. Also, these clips rely on friction to hold their components and fail to lock them in position positively. Therefore, the present invention has been devised to overcome the disadvantages of the clips presently known to the art and provide a novel and useful clip which can be mounted with a minimum of rivets, which will positively lock electrical components in position, and which will mount a maximum number of components in the minimum possible space.

It is, therefore, one object of this invention to provide mounting clips which can be affixed to a mounting board with a minimum number of rivets.

It is another object of this invention to provide mounting clips for securing a maximum number of components in the minimum possible space.

A further object of this invention is to provide mounting clips which provide positive locking of their associated components.

A still further object of this invention is to provide mounting clips which can be cheaply manufactured and which can be made in attached sections that may be easily broken into smaller sections to provide any desired number of attached clips.

Other objects and advantages will appear as the description of the invention proceeds.

In accordance with the invention, the mounting clip is flexible and has four generally flat surface portions and has the general shape of a J. A short side of the J is spaced apart from a long side thereof by a flat portion, the short side being slightly inclined toward the long side thereof to provide a spring action. An end of the long side has a flange thereon. The component to be held in position is mounted by forcing it under the short side of the J until it snaps into place and is positively held against the long side of the J by the flange and short side. An integral strip of such clips has slits and rivet holes disposed between adjacent clips to facilitate breaking of the integral strip into smaller units. In one embodiment of the invention each short side of each clip is provided with a pair of wings adapted to engage sides of the component to be mounted in the clip.

The features of this invention which are believed to be novel and patentable are pointed out in the claims which form a part of this specification. For a better understanding of the invention, reference is now made to the accompanying drawing, in which:

Figure 1:
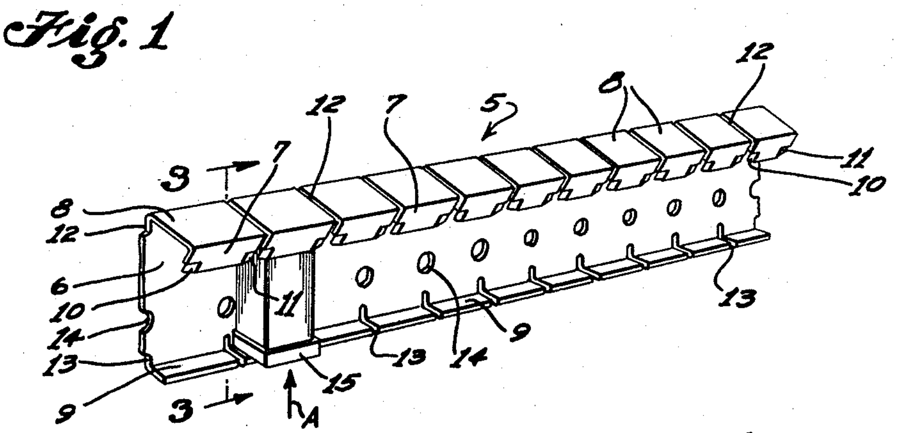
Fig. 1 is a perspective view of a plurality of clips embodying the invention and forming an integral strip.
Figure 3:
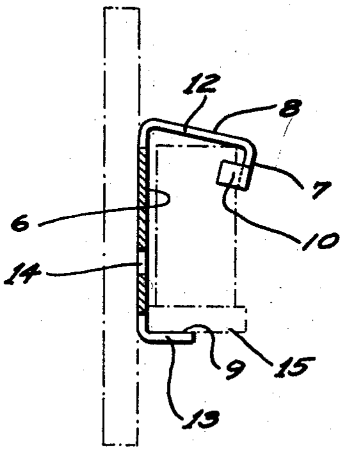
Fig. 3 is a sectional view taken through line 3—3 of Fig. 1.

Referring now to Fig. 1, there is shown a strip of attached mounting clips 5, made in accordance with the invention. Examining the left end of the strip, it will be seen that each clip has the general shape of a J with a long side 6, a short side 7 which is spaced from the long side and is bent toward the long side, and an intermediate or flat portion 8 connecting the long and short sides, the flat portion being bent toward the long side to form an acute angle therewith. The end of the long side 6 has a flange 9, and the short side 7 has a pair of wing-like elements 10 and 11 (Fig. 3) extending from opposite side edges and toward the long side, the wing-like elements lying in planes at an appreciable angle with respect to the planes of all of the other major surfaces of the clips. As will also be more clearly seen from the left end of the strip, a pair of oppositely disposed slits 12 and 13, respectively, and a rivet hole 14 are provided between adjacent clips. By aligning the slits 12 and 13 and the rivet hole 4, the strip of clips can be broken along a line including a pair of slits and a rivet hole to provide any desired number of clips. An electrical component, illustrated as a transistor 15, is shown inserted within the second from left-most clip of the strip, the long side 6 of the clip holding the transistor having a length equal to that of transistor 15 and the wing-like elements 10 and 11 embracing portions of opposite sides of the transistor.

Figure 2:
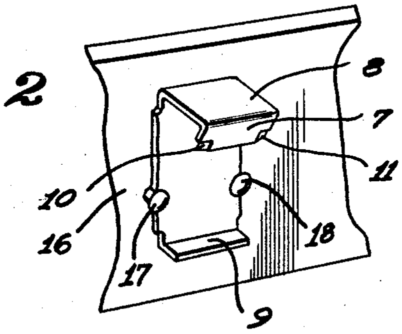
Fig. 2 is a perspective view of one clip broken away from an integral strip of the kind shown in Fig. 1, and secured to a mounting board.

In using the clip of the invention, the desired number of clips is first broken from the strip shown in Fig. 1 and fixed to a mounting board 16 by means of two rivets 17 and 18, one at each end of the strip. For example, as shown in Fig. 2, a single clip may be broken from the strip and fixed to the mounting board. A third rivet might be used in the center when long strips of clips are used. Then the electrical components to be held are inserted within each clip by forcing each component in the general direction A under the short side 7 of the J between the wing-like elements 12 and 13 until it strikes the flat portion 8. The component is then released and due to the spring action of the short side 7 of the clip it is forced against the long side 6 by short side 7 and is locked against the flange 9 by the flat portion 8. Thus, each component is positively locked in position and cannot be dislodged by vibration. By making the clip out of a beryllium-copper alloy, a strong spring effect can be achieved and yet the clips can be readily broken between any pair.

From the foregoing description it will be apparent that large numbers of components can be mounted securely with only a few mounting rivets. Moreover, these components can be mounted in a space that is almost as small as the area of the component itself due to the elimination of lugs that are provided in the prior art for riveting the clips to mounting boards. Therefore, the clips shown in Figs. 1 to 3 achieve all of the objects of the invention in that mounting clips are provided which can be affixed with a small number of rivets, which secure electrical components in the minimum possible space with positive locking action, which can be cheaply manufactured, and which can be made in sections that are easily broken into smaller sections.

It should be understood that the present invention is not limited to the holding of components of any particular size or shape since it will be obvious that the clips can be designed for different types of components. It should also be understood that although beryllium-copper has been found to be extremely useful as the substance out of which the clips are made, because it is sufficiently flexible to provide spring action and yet can be readily broken, the invention is not limited to this alloy. Thin spring steel or other metals will readily suggest themselves to those skilled in the art for accomplishing the same results as beryllium-copper. It should also be obvious that the clip of the invention is not limited to being used with printed circuits, but may be used wherever the mounting of components in a minimum space is desired. Moreover, it should be clear that other variations of the present invention are possible; for example, the clips need not necessarily be severable from one another, or only the flat portion 8 or the short side 7 of the J need be bent toward the long side 6, thereby inclining the short side toward the long side. However, all such modifications will utilize the basic principles of the invention, namely, that the short side 7 of the J must clamp the electrical component against the long side 6, and that the flange 9 on the long side urge the component against the flat portion 8 of the J.

What I claim as new and desire to secure by Letters Patent of the United States is:

1. A device for mounting a plurality of components each of a given length and width comprising, a plurality of flexible clips each having the general shape of an inverted J with a long side of said given length, a substantially flat short side inclined toward its long side to provide spring action, and a flat intermediate portion joining said long and short sides, each of said clips having a flange on the end of its long side and extending toward its short side, and each of said clips also having a pair of wing-like elements adapted to embrace one of said components and respectively disposed on opposite edges of the short side and extending toward the long side and lying in planes at an appreciable angle with respect to the plane of the long side, said clips being joined together in such a manner as to form a single strip which may be readily broken between any two adjacent clips, each of said clips being constructed to receive one of said components therein to provide substantially the sole support therefor.

2. A device for mounting a plurality of components each of a given length comprising: a plurality of flexible clips each having the general shape of an integral inverted J with a long side of said given length, a flat portion, and a short side horizontally spaced from said long side by said flat portion; the short side of each clip being inclined toward its long side to provide spring action, and each of said clips having a flange at the end of its long side and extending toward its short side, said clips being joined together in such a manner as to form a single strip with slits and a rivet hole between adjacent clips so that it may be readily broken between any two adjacent clips, each of said clips being constructed to receive one of said components therein to provide substantially the sole support therefor.

3. A device for mounting a plurality of components each of a given length and width comprising: a plurality of flexible clips each having the general shape of an inverted J with an integral long side of said given length, a flat portion, and a short side horizontally spaced from said long side by said flat portion; the short side of each clip being inclined toward its long side to provide spring action, each of said clips having a flange on the end of its long side and extending toward its short side, and each of said clips also having a pair of wing-like elements adapted to embrace one of said components and respectively disposed on each edge of the short side and extending toward the long side and lying in planes at an appreciable angle with respect to the plane of said long side, said clips being joined together in such a manner as to form a single strip with at least one slit and a rivet hole between adjacent clips so that it may be readily broken between any two adjacent clips, each of said clips being constructed to receive one of said components therein to provide substantially the sole support therefor.

4. A device for mounting a plurality of components each of a given length and width comprising, a plurality of flexible clips each having the general shape of a substantially flat inverted J with a long side of said given length, a short side horizontally spaced from said long side, and a flat portion joining adjacent ends of said long and short sides, said short side having an end portion remote from said first named end thereof and inclined toward said long side to provide spring action, each of said clips having a flange on the end of its long side opposite said first named end thereof and extending toward its short side, and each of said clips also having a pair of spaced-apart wing-like elements adapted to embrace one of said components and respectively disposed on each edge of said remote end of said short side and extending toward said long side, said elements lying substantially in planes at an appreciable angle with respect to the plane of said long side, said clips being joined together to form an integral strip and having a pair of slits and a rivet hole between adjacent clips whereby said clips are adapted to be readily broken apart between any two adjacent clips, said clips being made of a beryllium-copper alloy.

5. A flexible clip for mounting between its sides a component of a given length, width and thickness, said clip having the general shape of an inverted J and comprising: a long side substantially having the given component length, an intermediate side integral with said long side and extending at an acute angle from one end thereof for the given component thickness; a flange integral with said long side and extending from the other end thereof at a substantially right angle; and a short side integral with said intermediate side and extending therefrom at a substantially right angle for a length such that the spacing between the free end of said short side and said long side is substantially equal to the component thickness, thereby to provide a spring action for holding the component in place, the corners at the free end of said short side being folded back toward the long side in such a manner that the spacing therebetween is substantially equal to the given component width, thereby firmly holding the component in place therebetween.

References Cited in the file of this patent

UNITED STATES PATENTS

| | | |
|---|---|---|
| 566,544 | Smith | Aug. 25, 1896 |
| 1,602,341 | Day | Oct. 5, 1926 |
| 1,755,304 | Olsen | Apr. 22, 1930 |
| 2,003,856 | Gimbel | June 4, 1935 |
| 2,071,096 | Weber | Feb. 16, 1937 |